M. C. FRANK.
PNEUMATIC TIRE.
APPLICATION FILED MAY 28, 1918.

1,322,777.

Patented Nov. 25, 1919.

INVENTOR
Maxwell C. Frank

UNITED STATES PATENT OFFICE.

MAXWELL C. FRANK, OF PIEDMONT, CALIFORNIA, ASSIGNOR OF ONE-HALF TO NATE LE VENE, OF SAN FRANCISCO, CALIFORNIA.

PNEUMATIC TIRE.

1,322,777.  Specification of Letters Patent. Patented Nov. 25, 1919.

Application filed May 28, 1918. Serial No. 237,036.

*To all whom it may concern:*

Be it known that I, MAXWELL C. FRANK, a citizen of the United States, residing at Piedmont, in the county of Alameda and State of California, have invented certain new and useful Improvements in Pneumatic Tires, of which the following is a specification.

My invention relates to vehicle tires of the pneumatic type, for the ordinary motor vehicle in common use.

In the manufacture of this type of tire as now practised, the casing member is provided with walls, which terminate in beads, and the various layers of fabric comprising the walls are closely wound around the bead-core positioned in said bead and finally subjected to heavy pressure in a mold, thus forming the well-known bead; the function of which, is to bear the stresses of the working load of the vehicle and to form means for anchoring the casing to the tire rim. Owing to this bead the manufacturing cost of the tire casing is very high, because it necessitates the provision and use of powerful, heavy, bead-forming, hydraulic equipment, and the requirement of an excessive amount of rubber and fabric for the bead-core and its support.

The objects of my invention are to eliminate this bead, the excessive amount of materials made necessary by it, and the expensive, high-pressure, beading equipment, and thus reduce the present high factor in the manufacturing cost of pneumatic tires.

A further object is to reduce the thickness of the casing walls, and to provide metal side walls for the tire to support the load that was formerly carried by the beaded walls, and also to eliminate side abrasion of the casing walls and rim cutting, both now common mishaps with beaded casings.

A still further object is to produce a tire, that offers minimum upkeep expense, one that is durable and capable of heavy duty, and that can not only be manufactured more cheaply than the present beaded one, but also, one that can be sold at a comparatively less price.

These and other objects are accomplished by means of the novel construction and arrangement of parts hereinafter illustrated, described and claimed.

Figure 1:
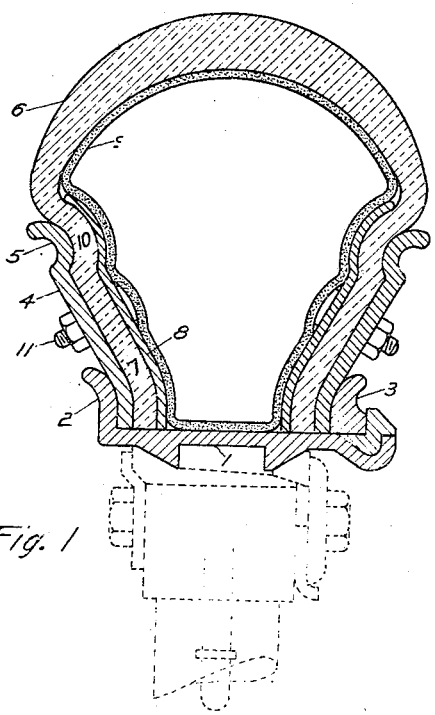
Figure 3:
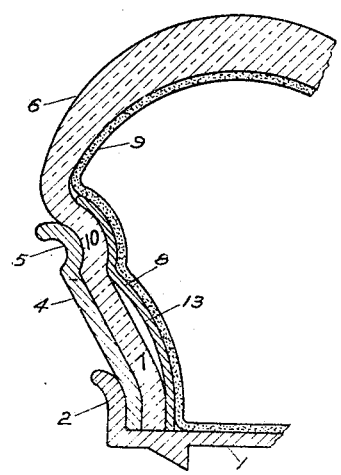
Figure 2:
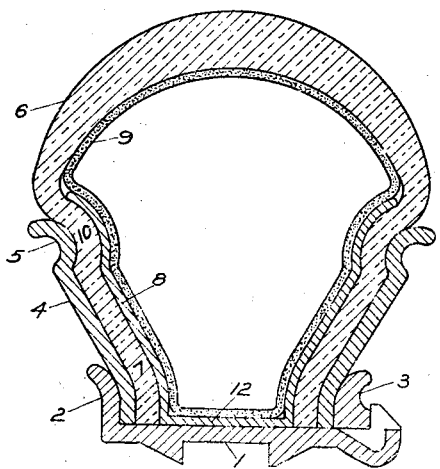
Figure 4:
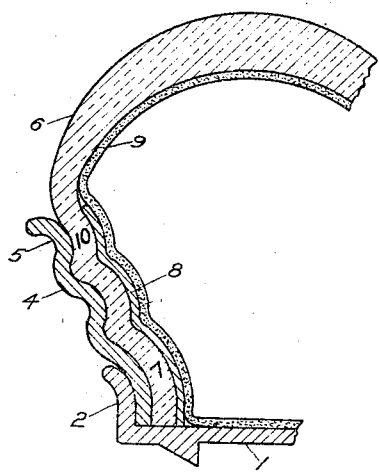

In the accompanying sheet of drawings showing the parent idea of my invention, Figure 1 represents a cross-section of the improvement mounted on a vehicle wheel, only a portion of the latter being shown. Fig. 2 shows a cross-section of my device in which the interior rings are joined at their bases; and Fig. 3 is a sectional elevation similar to Fig. 1, with a part broken away and shows the applied pressure concentrated at two regions on the casing walls; and Fig. 4 is a cross-section of a tire, part of which is also broken away, showing the applied pressure evenly distributed on the casing walls.

Similar numerals of reference indicate corresponding parts in all the figures, in which:

The dotted lines in Fig. 1 represent a portion of a vehicle wheel of the demountable rim type, and 1, is the tire-carrying rim, and is here shown as having a fixed shoulder 2, and a removable one 3, adapted to be locked in position on the rim by any of the usual methods. Mounted on the rim between the shoulders and adjacent thereto, are preferably, metallic rings 4, each formed at its inner edge to correspond with, or to suit the shoulder, and at its outer edge with a beaded or gripping portion 5. Also mounted on the rim between and adjacent said rings 4, is my improved tire casing 6, similar in construction to present casings, excepting that the depending wall or flanks 7 thereof, are constructed without the usual beads.

Also positioned on the tire-carrying rim are inner rings 8, preferably of resilient, light plate metal, shaped to correspond or to suit the outer rings 4, and adapted to bear against the flanks 7.

In the space formed by the casing, inner rings and rim, the usual lining strip or flap (not shown) and inflation tube 9 may be positioned. The tube is here shown inflated, causing the tire to assume its final, working position. To assume this final position the inner tube is inflated slowly, causing the gradual alinement on the rim, of the rings and casing that were previously slipped over it and retained thereon, by the aforementioned removable shoulder 3, then the gradual seating of the flexible and yielding casing flanks, between the rings 4 and 8, then the final locking and holding position which causes beads 10, to form on the casing flanks, corresponding to the beaded formation of the rings.

Previous to the insertion in the tire of the tube 9, I may wish to partially aline the casing and rings; this I could accomplish by inserting bolts 11, or the like, through registering holes previously cut in the casing and rings and spaced at intervals on a pitch-circle, then after the final inflation has been done, tighten the bolts. In some cases I may wish to accomplish this partial alinement by connecting the inner rings 8, at their inner edges by the band 12, forming a channel as shown in Fig. 2. This channel, made of resilient plate material is drawn inwardly at its beaded edges and positioned in the casing, then mounted on the rim; and by reason of its resilient rings bearing outwardly, partial alinement results.

In Fig. 3, I show the inner rings 8 of my invention, dished a little as at 13, to concentrate the applied pressure thereon at two regions on the casing flanks, the beaded region and the region about its inner edge. This increased pressure on said regions, keeps the flanks in compression thereat, and in tension therebetween, tending to produce a more secure gripping relation between the casing and rings.

In Fig. 4 the major portion of both rings have been beaded, thus forming a series of beads on the casing flanks when the tire is inflated.

Having described my invention, it is to be understood that the same covers all other variations which come within the spirit of the invention, and which are within the scope of the claims.

What I claim as new and desire to secure by Letters Patent of the United States, is the following:

1. A vehicle tire, comprising a casing and two pairs of detachable, metallic side rings, the casing being provided with depending, beadless side flanks, and each flank adapted to be held between a pair of the said side rings for retaining the casing in position.

2. In a penumatic tire, a casing provided with a curved tread portion and depending, side-wall portions, and adjustable grooved rings for engaging said side-wall portions; said rings adapted to form beads on the casing adjacent to the region of tangency of the curved and straight portions of said casing for locking engagement therewith.

3. A pneumatic tire, comprising a flexible body provided with a tread portion and depending side flanks, and grooved, nesting metal side rings in pairs, for incasing and engaging therebetween the said side flanks, and said side rings adapted to receive the stresses imparted by said tread portion.

4. A vehicle tire, comprising a tire casing, metallic side rings in pairs, and an inner tube; said casing provided with depending, beadless side flanks, each flank adapted to be positioned between a pair of the said side rings, and said tube adapted to be positioned within said tire for inflating the casing and for causing the rings to move laterally to seat, thereby forming gripping engagement with said side rings.

5. A pneumatic tire, comprising a shouldered vehicle rim, two pairs of concentrically formed, metallic rings; a casing provided with beadless side walls, and an inner tube; said rim adapted to receive and to hold a pair of said rings adjacent to each of its shoulders, and each pair of said rings adapted to engage between its adjacent faces a wall of said casing, and said inner tube adapted to be positioned within the hollow formed by the above-positioned elements and inflated, thereby causing the alinement and securement of said casing and rings on said rim.

6. A pneumatic vehicle tire, consisting of a beadless tread member, the walls thereof adapted to be positioned between resilient, metallic side members, and an inner tube; said tube adapted to be inflated for alining said tread member and said side members, and for concentrating the applied pressure on said resilient side members at predetermined points on the walls of said tread member for forming beaded holding engagement with said side members.

7. A pneumatic tire, comprising a tire rim, a flexible casing having depending, beadless side walls and a thickened tread portion, two pairs of comparatively wide and thin nesting grooved rings adapted to be positioned on said rim with respect to said side walls, and an inner tube adapted to be inflated to impart pressure to, and cause adjustment between the above members of said tire, each pair of said ring members embracing and interlocking therebetween a side wall of said casing member for the securement of said tire to said rim.

8. In combination with a vehicle wheel provided with a demountable rim, a casing having yielding, depending, beadless side walls adapted to be mounted on said rim, beaded rings adapted to be mounted and positioned on said rim adjacent to each side of said walls, and ar inner tube adapted to be inflated to force the rings laterally and the casing body to rotundity, thereby causing the said beaded rings and interposed casing side walls to brace against the shoulders on said rim, and form on the compressed casing side walls corresponding beads, for locking said casing to said rim.

9. In combination with a vehicle wheel, a shouldered tire-carrying rim adapted to be removably secured on the same, a yielding tire casing having beadless side walls adapted to be mounted on said rim, a plurality of comparatively heavy rings adapted to be positioned on said rim exteriorly of said walls, and comparatively light resilient, ring means adapted to be positioned on said rim interiorly of said walls, and means for inflating said tire to cause the inner ring means to brace against said outer rings, and compress therebetween the said side walls for airtight, locking engagement with said rim.

In testimony whereof I have affixed my signature, in the presence of two witnesses, this 23rd day of May, 1918.

MAXWELL C. FRANK.

Witnesses:
 LAURA F. FRANK,
 W. H. GYGUR.